(No Model.)

J. R. BENSON.
GATE.

No. 453,958. Patented June 9, 1891.

Witnesses:
E. P. Ellis
J. M. Nesbit

Inventor:
Jos. R. Benson
per
Lehmann & Pattison,
Attys.

THE NORRIS PETERS CO., PHOTO-LITHO., WASHINGTON, D. C.

UNITED STATES PATENT OFFICE.

JOSEPH ROBINSON BENSON, OF JUNCTION CITY, TEXAS.

GATE.

SPECIFICATION forming part of Letters Patent No. 453,958, dated June 9, 1891.

Application filed February 3, 1891. Serial No. 380,027. (No model.)

*To all whom it may concern:*

Be it known that I, JOSEPH ROBINSON BENSON, of Junction City, in the county of Kimble and State of Texas, have invented certain new and useful Improvements in Gates; and I do hereby declare the following to be a full, clear, and exact description of the invention, such as will enable others skilled in the art to which it pertains to make and use it, reference being had to the accompanying drawings, which form part of this specification.

My invention relates to an improvement in gates; and it consists in a gate which has a pivotal post at its center, upon the bottom of which post are formed cams, a support upon which the gate rests when closed, which is also provided with cams, a vertically-moving cam by means of which the gate is raised, and an operating mechanism upon each side of the gate for raising this cam and causing the gate to open, as will be more fully described hereinafter.

The object of my invention is to provide a gate which can be readily opened away from the person by simply pulling down upon a lever or cord, and which will then automatically close without any further care or attention.

Figure 1:
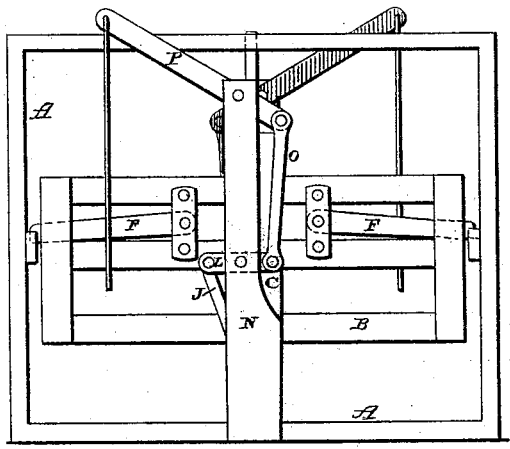
Figure 2:
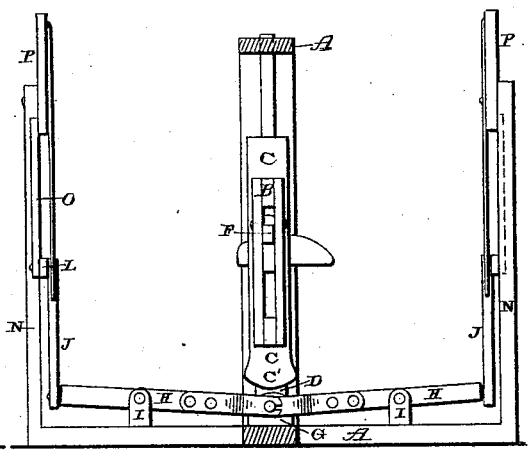
Figure 3:
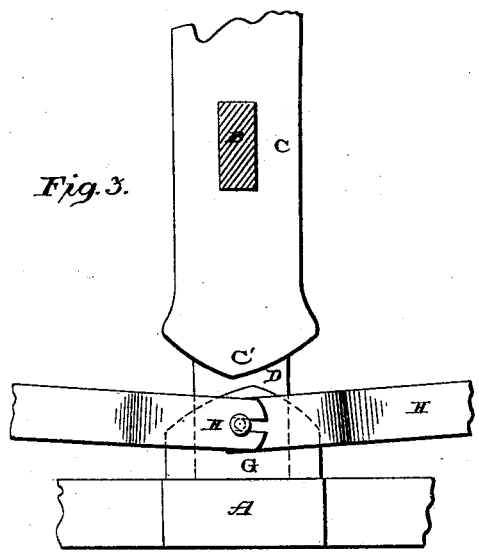
Figure 4:
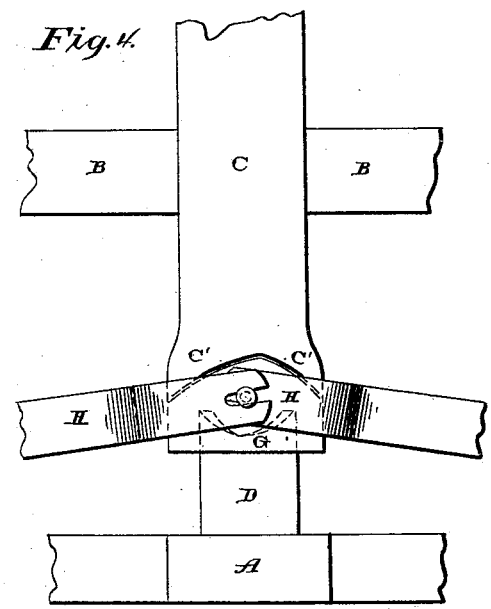

Figures 1 and 2 are side elevations of a gate taken at right angles to each other and which embodies my invention. Figs. 3 and 4 are detail views of the cams, showing the different positions of the parts.

A represents a suitable frame-work, in which the gate B is pivoted. The pivotal post C is placed at the center of the gate, and upon its lower end is formed a double cam C'. The lower end of this post rests upon a stationary support D, placed at the center of the lower portion of the frame, and which also has a cam formed upon its upper end. When the gate is closed, it rests directly upon the top of this support, and the cams upon the top of the support and the lower end of the pivotal post B being in the same plane, the gate swings shut and is locked at opposite ends by suitable latches F, which prevent the gate from being opened from either side unless one of the latches is operated and that end of the gate is drawn toward the person. As soon as the gate is released the two cams cause it to close automatically. Placed upon and moving vertically upon the central support D is the sleeve G, and which has its upper edge formed into a double cam, which extends at a right angle to the cam formed upon the lower end of the post C. The points of the cams upon the post and the sleeve are made to overlap instead of coming just opposite to each other, so that when the sleeve is raised by the pivoted levers H connected thereto the points of the cam upon the lower end of the post C will slide down the inclines of the cams upon the sleeve, and thus cause the gate to swing open. The levers H are pivoted upon suitable supports I, placed upon opposite sides of the gate, and to the outer ends of the levers are fastened the connecting-rods J, which are attached at their upper ends to the horizontal levers L, pivoted upon the supports N, placed at any suitable distances beyond the sides of the gate. To the opposite ends of the horizontal levers L are connected the connecting-rods O, which are attached at their upper ends to the operating-levers P, which are pivoted upon the supports N, and which levers are provided with long ropes or chains at their free ends which extend directly over the road. When a pull is exerted upon the rope or chain, the levers H cause the sleeve to be raised, and this sleeve raises the gate with it. As soon as the weight of the gate is brought to bear upon the sleeve its gravity causes it to turn upon the cams of the sleeve, and thus open and stand in a line with the road. The sleeve raises the gate sufficiently high to release the latches, and then the weight of the gate at once comes into play and causes it to swing open. As soon as the pull upon the outer end of the operating-lever is released the sleeve sinks, and then the gate rests wholly upon the support D, and the points of the cam on the post C slide downward upon the cam upon the support, causing the gate to close. The cam upon the upper edge of the sleeve stands at a right angle to the cam upon the upper end of the support, and hence as soon as the upper edge of the sleeve begins to rise above the support the gate is lifted from the support and the weight of the gate causes the gate to swing open. While the gate is in a raised position the points of the cam upon the lower end of the post C overlap the points of the cam upon the upper edge of the support, and when released the weight of the gate causes it to close without any care or attention upon the part of the one who has opened the gate, either by operating the latch by hand or by means of the operating mechanism upon each side. After a person has opened the gate by pulling down upon the operating-lever upon either side he continues to hold down upon the lever until he has passed nearly through the gate, and then upon releasing the lever the gate swings shut behind him.

Having thus described my invention, I claim—

1. The combination of a gate provided with a pivotal post at its center which has a cam upon its lower end, a stationary support for the gate having a cam upon its upper end, a sleeve placed upon the support and provided with cams upon its upper edge, and an operating mechanism placed upon each side of the gate for raising the sleeve, substantially as shown.

2. The combination of a suitable framework in which the gate is pivoted, a gate which is provided with a pivotal post at its center, which post has a cam upon its lower end, a stationary cam for supporting the gate, a sleeve provided with cams upon its upper edge, and a series of levers and connecting-rods by which the sleeve is raised for the purpose of opening the gate, substantially as described.

In testimony whereof I affix my signature in presence of two witnesses.

JOSEPH ROBINSON BENSON.

Witnesses:
FRANK VICKREY,
D. P. COWSERT.